(12) United States Patent
Kou

(10) Patent No.: US 10,883,614 B2
(45) Date of Patent: Jan. 5, 2021

(54) VALVE ACTUATOR AND DIAPHRAGM VALVE INCLUDING THE SAME

(71) Applicant: Kitz SCT Corporation, Tokyo (JP)

(72) Inventor: Chokuto Kou, Gunma (JP)

(73) Assignee: KITZ SCT CORPORATION, Tokyo (JP)

( * ) Notice: Subject to any disclaimer, the term of this patent is extended or adjusted under 35 U.S.C. 154(b) by 0 days.

(21) Appl. No.: 16/473,651

(22) PCT Filed: Nov. 15, 2017

(86) PCT No.: PCT/JP2017/041036
§ 371 (c)(1),
(2) Date: Jun. 26, 2019

(87) PCT Pub. No.: WO2018/142718
PCT Pub. Date: Aug. 9, 2018

(65) Prior Publication Data
US 2019/0353258 A1    Nov. 21, 2019

(30) Foreign Application Priority Data
Jan. 31, 2017    (JP) .................................. 2017-15741

(51) Int. Cl.
*F16K 7/16*        (2006.01)
*F16K 31/163*      (2006.01)
*F16K 31/524*      (2006.01)

(52) U.S. Cl.
CPC ............. *F16K 7/16* (2013.01); *F16K 31/163* (2013.01); *F16K 31/52491* (2013.01)

(58) Field of Classification Search
CPC ............. F16K 27/0236; F16K 31/1221; F16K 31/1262; F16K 31/1266; F16K 31/163;
(Continued)

(56) References Cited

U.S. PATENT DOCUMENTS

| 4,684,103 A | * | 8/1987 | Baumann | ............ F16K 31/1262 251/280 |
| 5,215,286 A | * | 6/1993 | Kolenc | ..................... F16K 7/12 251/214 |
| 5,253,671 A | | 10/1993 | Kolenc | |

FOREIGN PATENT DOCUMENTS

| JP | 09-026052 | 1/1997 |
| JP | 4529023 | 8/2010 |

(Continued)

OTHER PUBLICATIONS

International Search Report dated Feb. 20, 2018 in International (PCT) Application No. PCT/JP2017/041036.

*Primary Examiner* — Hailey K. Do
(74) *Attorney, Agent, or Firm* — Wenderoth, Lind & Ponack, L.L.P.

(57) ABSTRACT

Provided is a valve actuator in a simple structure and easily downsizable, having reliable valve openability and closability even under high pressure, and also capable of exerting high durability even with a high frequency of valve opening and closing, and a diaphragm valve including this valve actuator. In the valve actuator, a repulsive member provided in an actuator main body, a piston pressed by this repulsive member, and at least two air chambers for moving the piston by an air pressure are arranged and a booster mechanism for exerting a force amplified in a valve-closing direction is accommodated in any of the air chambers.

9 Claims, 4 Drawing Sheets

(58) Field of Classification Search
CPC ............. F16K 31/165; F16K 31/52408; F16K 31/52491; F16K 7/16; F16K 7/17
See application file for complete search history.

(56) References Cited

FOREIGN PATENT DOCUMENTS

| | | |
|---|---|---|
| JP | 2012-037048 | 2/2012 |
| JP | 2015-223647 | 12/2015 |

* cited by examiner

VALVE ACTUATOR AND DIAPHRAGM VALVE INCLUDING THE SAME

TECHNICAL FIELD

The present invention relates to a valve actuator and a diaphragm valve including the same and, in particular, to a valve actuator extremely suitably configured for downsizing of the entire valve structure while exerting high valve closability also for a high-pressure fluid and a diaphragm valve including the valve actuator.

BACKGROUND ART

In general, as a control valve for a gas supply system in semiconductor manufacturing process or the like, a so-called direct-touch-type diaphragm valve is mainly used. The direct diaphragm valve has its advantages in which the seat is directly closed also with a metal diaphragm for use as a material for sealing outside, a very simple flow path without having extra components in a gas contact part can be configured, and this is thus thought to be an optimum structure for cleaning a fluid, without a part where metals slide each other inside the gas contact part. However, there is a limit to the stroke that can be ensured, and it is structurally difficult to ensure a large flow rate, compared with other valve types such as a bellows valve.

The diaphragm valve for use in semiconductor manufacturing process as described above is often provided with an air-driven actuator for automatic control and so forth. The air-driven actuator is very excellent in cleanliness, cost, and so forth, is extremely suitable for use in a semiconductor manufacturing apparatus, and requires integration of devices. Thus, normally, in accordance with a compact footprint area occupied by a valve body formed in a rectangular shape, the air-driven actuator is required to be downsized in a compact form so as to be accommodated in this area. In particular, in an integrated gas system in which plumbing is blocked as a base block without intervention of couplings, the actuator is attachably and detachably attached to an upper part of a base block via an interface, thereby exerting high maintainability for each device almost without occurrence of wasted space and being used in many scenes.

Furthermore, to manufacture highly accurate devices such as semiconductor elements with high quality, semiconductor manufacturing process facilities such as a gas supply system as described above are required to be entirely accommodated in a so-called clean room. The clean room is a hermetic space where airborne particles and microbes are controlled at a predetermined level of cleanliness (contamination control); workers to enter the room, as well as materials, chemicals, water, and so forth to be brought in, are ensured to have a predetermined level of cleanliness; and environmental conditions such as temperature, moisture, and pressure are also controllable as required. In introducing the clean room, initial cost of equipment, which increases with capacity, and running cost for maintenance and continuous operation are required, which are a large burden as cost of production equipment. Thus, in introducing the clean room, the clean room has to be designed and constructed so as to have capacity and structure that are optimum and minimum in accordance with the use purpose and prevent the occurrence of waste.

On the other hand, in recent years, demands for higher performance, more power saving, an improvement in performance, and so forth of semiconductor-mounted devices such as smartphones are increasing more. Accordingly, microfabrication and high integration are more required for semiconductor elements, and diversification of semiconductor manufacturing process has been significantly advancing. Thus, also for various process gases for use in manufacturing process, higher temperature, higher pressure, and so forth are involved in accordance with individual use purposes. In particular, in accordance with an increase in the diameter of a silicon wafer, an increase in the size of a liquid-crystal panel or the like, an increase in the size of a production system, a change to a special gas supply scheme, and so forth, a further increase in a supply flow rate (high flow) has become a basic demand. Thus, also for the diaphragm valve as described above for use as a supply gas control valve, valve development optimum for individual use purposes is thought to be required. In particular, demands for a larger flow rate (increase in a Cv value) are increasing more.

While the gas supply system or the semiconductor manufacturing apparatus is entirely accommodated in the clean room, the clean room has to be optimized in a compact form with a minimum capacity as required. Thus, the valve as described above for use in the gas supply system is also required to be downsized more and compact more. Thus, for the diaphragm valve as described above, demands for achieving both downsizing and a high flow are further increasing. Furthermore, combined with demands for diversification of process gas and a high flow, demands for supporting high pressure are also increasing.

Here, a diaphragm valve including an actuator of one type is such that a piston of the actuator is pressed by a spring and a diaphragm is seated by this pressing force on a seat to close the valve. However, as described above, although a further larger closing force is required to achieve a high flow and support high pressure, downsizing of the spring of the actuator is unavoidable with downsizing of the valve, thereby posing a problem of decreasing the pressing force of the spring to decrease the valve closing force. If the closing force of the valve is impaired, accurate fluid control over process gas is impaired, and a fatal defect in product quality may occur. Moreover, since the process gas is highly harmful to human bodies, even a small amount of leakages may pose a large problem. Furthermore, when the installation area is limited by downsizing the valve, applicable springs are limited to those having a predetermined small wire diameter or spring diameter, thereby increasing stress to be added to one spring to pose a problem also in durability of the spring.

To maintain or increase the closing force in the valve as described above, a structure can be thought, for example, in which a plurality of pistons are configured in multistage to form air chambers and springs alternately in a longitudinal direction. In this case, there is a problem that the actuator extends to a height direction to increase the size of the valve.

As described above, the diaphragm valve is integrated together with other devices and the like, and also diaphragm valves are normally provided at a plurality of locations. Therefore, if the size is increased, the installation area and height are also increased, the occupying space of the semiconductor manufacturing apparatus in the clean room is also increased and, in turn, the increase of the size of the clean room or the like brings problems such as an increase in semiconductor manufacturing cost. In particular, an increase of the valve size in a lateral width direction increases a foot space, which is a fatal defect in designing a gas supply system for achieving filling in a compact and optimum space. Also, an increase in a height direction poses problems with fear of interference with other devices and apparatuses arranged therearound, a failure in ensuring a necessary space, and so forth. Thus, it is difficult to adopt a structure in which an increase of the valve size in a lateral direction and/or a longitudinal direction is unavoidable.

Other than that, for example, a structure can also be thought in which springs are doubly provided to one piston. This case has a problem that downsizing is structurally limit and the valve cannot be appropriately downsized. Moreover, in the case of the structure as described above using many pistons and springs, the diaphragm is pressed by interlocking via many components. Thus, the valve closing force becomes more unstable due to state variations for each component and so forth, and an accurate fluid control function may be impaired Thus, to appropriately downsize the valve and ensure a sufficient valve closing force by maintaining or increasing the pressing force of the spring, adoption of a simply-configured booster mechanism can be thought. As a previous technique of this type, PTLs 1 to 3 have been suggested.

In a controller described in PTL 1, a casing is formed of a hollow lower casing that is open upward and a hollow upper casing that is open downward. On the inner circumference of a butt portion of these, a partition plate is fixed. A cylinder chamber having a circular horizontal cross section is formed above the partition plate in the casing, and an accommodation chamber for a motive power amplifying apparatus having a rectangular horizontal cross section is formed therebelow, respectively. Also, the motive power amplifying means includes a tapered member tapered with a predetermined structure, a disk-shaped member, and first and second swing bodies arranged so as to be opposed to each other via the tapered member and swingable about a swing shaft penetrating through a lower part. Also, a lower contact surface of each swing body is an arc-shaped cam face with a center line at a position eccentric from the axis line of the swing shaft taken as a center. Furthermore, a mode is described in which the first and second swing bodies have their lower parts superposed each other and the swing shaft is common to both.

Described in PTL 2 is an actuator in which a seal part is excellent in durability even with respect to heat load and repetitive actuations, a cam for moving a shaft in reverse to the moving direction of a piston is incorporated. Specifically, a flange is provided to the shaft coupled to another end of a stem, and one end of a cam rotatably provided with a pin at each of three equiangular positions on a bonnet is engaged with this flange and the other end of the cam is provided with a roller in contact with a lower surface of the piston. When high-pressure air is introduced to an air chamber, the piston is pushed downward together with extension of a bellows, thereby pushing the roller at the other end of the cam to be pressed to rotate about the pin. With this rotation, the one end of the cam pushes up the flange to move the shaft to a direction reverse to the pushing-out direction of the piston.

Described in PTL 3 is a structure of a motive power doubling mechanism (116) in FIGS. 1 and 2 of PLT 3, which is configured as follows. Rod-shaped levers (118, 120) are rotatably provided respectively to two pins (122, 128) provided so as to cross between paired support members (124, 126) symmetrically coupled to a bottom wall (86). Two levers (118, 120) each have an upper end that can make contact with and slide on a piston (98) via a slide plate (130), and have respective intermediate parts (134, 136) each at a lower end position serving as so-called cam faces to be able to make contact with and slide on an upper surface of a pressure-receiving plate (140).

With this structure, in FIGS. 1 and 2 of PLT 3, the motive power of the piston (98) pushed down by the springs (110, 112) is increased by the principle of leverage of the two levers (118, 120) and is transferred to a rod (78) via the pressure-receiving plate (140) to close the valve. When the valve is opened, air from an air supply source (94) is supplied via flow paths (92, 104) to a hermetic space formed on a lower part of a chamber (106). With an increase in pressure of this hermetic space, the piston (98) is pushed up.

Also, in FIGS. 1 and 2 of PLT 3, the rod (78) has a spherical head at an upper end (142) engaged with a tapered part (144) that is open to a lower side of the pressure-receiving plate (140), has a shoulder part (156) with which a compression spring (154) for supporting ascending movement is engaged and, furthermore, includes a seal ring (150) that can vertically slide as a seal member between the rod and a neck part (148) provided on a lower part of the bottom wall (86).

CITATION LIST

Patent References

PTL 1: Japanese Patent No. 4529023
PTL 2: Japanese Patent Application Laid-Open No. 9-26052
PTL 3: U.S. Pat. No. 5,253,671

SUMMARY OF INVENTION

Technical Problem

However, in PTL 1, since the cylinder chamber and the accommodation chamber for the motive power amplifying apparatus are stacked respectively in series in the longitudinal direction via the partition plate in the casing, the structure is such that an increase in the size of the valve to the longitudinal direction is unavoidable. Also, the motive power amplifying means is configured so that the upper contact surface of the swing body assuming an arc shape slides on the tapered member integrally provided with a lower end of an activation shaft provided near the axial center position of the valve and tapered to extend vertically downward to boost the motive power from the piston. Thus, the long plate-shaped main body has to always maintain the orientation standing in the longitudinal direction and, after all, has no choice but to be elongated as a whole to the height direction of the valve. Furthermore, the structure of this motive power amplifying means is excessively complex, such as the tapered member and each swing body in a predetermined structure, and is unsuitable for downsizing as a whole.

The booster mechanism as described in PTL 2 is configured in which the plurality of plate-shaped cams are arranged to be opposed to each other symmetrically with respect to the axial center of the valve as having an orientation falling to the horizontal direction and, in this state, each cam slightly rotates about the pin to boost the motive power from the piston. Thus, to accommodate the plurality of these cams, a wide accommodation space has to be ensured inside the actuator to a lateral direction. In practice, the cam mechanism is accommodated in a large-diameter part on another end side of a housing and, after all, the structure can be said as unsuitable for downsizing of the valve. Furthermore, since the cam mechanism is contiguously provided in a longitudinal direction to an air chamber in the large-diameter part via the piston, the valve size is easily increased also to the longitudinal direction.

On the other hand, in PTL 3, firstly, the hermetic space serving as an air chamber to which air is supplied is provided only to the lower part of the chamber. Also, in the structure of the actuator in PLT 3, no mention is made at all of an increase in the capacity of the air chamber or an increase in the number of air chambers and thus a single air chamber structure is presumed. By contrast, the air pressure to press the piston upward at the time of valve opening increases in accordance with an increase in the capacity of a space where the air chamber is formed. Thus, in the case in which the air chamber has a single structure as in PLT 3, in particular when the actuator is downsized, a sufficient air pressure cannot be ensured, and the valve's favorable valve-openability may be impaired.

Next, the booster mechanism of PLT 3 has two levers pivotally attached to the respective pins, thereby making the structure complex. Also, a wide capacity has to be ensured as a space to be accommodated in the actuator. These are disadvantages regarding cost, productivity, durability, and maintenability, and adopting the structure is difficult particularly in view of downsizing. In particular, a large accommodation space in a lateral width direction of the actuator is indispensable, which places many limitations on downsizing. Also, the position where an intermediate part of two levers acts with the pressure-receiving plate (the contact position of the cam surface) is near the position of a circumferential edge part of the pressure-receiving plate, which is far away from the axial center position of the valve where the rod is arranged. Moreover, the pressure-receiving plate and the rod are separate members, and a contact area is small. Thus, a force from the levers to the rod is difficult to be transferred. Also, force transmission tends to be nonuniform and destabilized. Thus, particularly in the case of high pressure, the valve's favorable closability may not be acquired.

Also, in the case of the structure described in PLT 3, when air is supplied to the hermetic space on the lower part of the chamber, the internal pressure in accordance with the opening area of the bottom wall is received by the rod. Thus, with the supply of air, the rod is caused to descend to press the diaphragm, and the valve may not be appropriately open. However, no consideration, description, or suggestion is found at all regarding this point. Furthermore, the rod is provided with a seal ring and a compression spring which presses the shoulder part, which makes the structure complex, and the structure is completely inappropriate for downsizing. On the other hand, in the case of a simple structure without having these, the valve-opening force may be insufficient, and this point is also not mentioned at all. Still further, springs for pressing the piston are doubly provided, which is also inappropriate for downsizing.

Still further, the upper ends of two levers slides on the slide plate, and the pressure-receiving plate also slides on the head of the upper end of the rod. Thus, with a large friction force among members, force transfer is impaired and the members are easily damaged, which invites degradation in durability and a reduction in life. There is also a problem of polluting air due to dust occurring by sliding. Still further, this separate and complex structure is a structure totally ineligible for downsizing. Still further, contact positions at two locations between the upper ends of the two levers and the piston are laterally asymmetrical in a planar view of the piston, and the contact area is small. Thus, the resultant of forces the piston receives from the springs and the contact locations of the two levers is biased to make the piston easily shifted from the inner circumferential surface of the chamber, which may deform or damage the piston or impair sealability to degrade valve openability. Also, durability to many open/close operations is doubtful. Furthermore, forces concentrate on a small contact area to cause dust and damage to easily occur by sliding.

Thus, the present invention has been developed to solve the above-described problems, and has an object of providing a valve actuator in a simple structure and easily downsizable, having reliable valve openability and closability even under high pressure, and also capable of exerting high durability even with a high frequency of valve opening and closing, and a diaphragm valve including this valve actuator.

Solution to Problem

To achieve the object described above, a first aspect of the invention is directed to a valve actuator in which a repulsive member provided in an actuator main body, a piston pressed by this repulsive member, and at least two air chambers for moving the piston by an air pressure are arranged and a booster mechanism for exerting a force amplified in a valve-closing direction is accommodated in any of the air chambers.

A second aspect of the invention is directed to the valve actuator, in which the booster mechanism is configured so that paired cam members are pivotally attached to a common swing shaft and these paired cam members are accommodated in the air chamber, these cam members each have provided at an upper end part a contact part in contact with the piston, while having provided at a lower end part a cam face in contact with an output member, and motive power of the piston pressed by the repulsive member is amplified by the cam members rotating via the swing shaft by taking the contact part as a point of effort, taking the swing shaft as a fulcrum, and taking the cam face as a point of load and is transferred to the output member.

A third aspect of the invention is directed to the valve actuator, in which the contact part is provided with a roller part having a roller and, with this roller rotating and moving a contact surface with the piston, the cam member rotates via the swing shaft.

A fourth aspect of the invention is directed to the valve actuator, in which the output member is a disk member formed of a large-diameter part in contact with the cam face of the cam member and a small-diameter part that can fit in an attachment hole formed in a base on a lower part of the actuator, and an O ring is attached to an inner circumferential surface of the attachment hole to seal between the inner circumferential surface and the small-diameter part.

A fifth aspect of the invention is directed to the valve actuator, in which the small-diameter part has a diameter set at a diameter to the extent that when air is supplied into the air chamber, a force by which the disk member is moved toward inside the air chamber based on a self-reset counterforce of the diaphragm is larger than a pressure with which the disk member is pushed by a supply air pressure to outside of the air chamber.

A sixth aspect of the invention is directed to a diaphragm valve including the valve actuator, in which a diaphragm is pressurized via the output member to a valve seat provided in a body for valve-closing.

Advantageous Effects of Invention

From the first aspect of the invention, the booster mechanism is configured to be accommodated in any of the air chambers, and therefore the occupying spaces required for both of the air chambers and the booster mechanism are integrated. Thus, while a sufficient valve closing force is ensured, the actuator can be significantly downsized. At the same time, since at least two air chambers are arranged, while an excessive increase in the size of the actuator is avoided, a required air pressure can be sufficiently ensured, and thus a reliable valve-opening force can be guaranteed. Therefore, a significantly-downsized valve actuator also with reliable valve openability and closability can be provided.

From the second aspect of the invention, the booster mechanism is configured with the paired cam members pivotally attached to one swing shaft and, since the structure of each cam member is simple, a simple structure can be achieved as a whole. Thus, not only productivity, handleability, and maintenability but also durability of the actuator is increased, and the invention is extremely suitable also for downsizing.

From the third aspect of the invention, with the roller part interposed, sliding between the cam member and the piston can be almost eliminated. Thus, damage on a member and a loss of motive power of the piston, or air contamination due to occurrence of dust due to sliding of both members can be extremely reduced.

From the fourth aspect of the invention, since the output member has an extremely simple structure formed of the large-diameter part and the small-diameter part, productivity, handleability, maintenability, and durability of the actuator are increased, and the invention is extremely suitable also for downsizing. Furthermore, since a space between the disk member and the base is sealed by the seal member provided on a base side as a still side, the invention can significantly contribute to downsizing on the base side.

From the fifth aspect of the invention, only by setting the diameter of the small-diameter part of the disk member at an appropriate size, reliable normal operation of the disk member can be guaranteed. Specifically, there is no fear that with supply of air to the air chamber, the air pressure inappropriately acts so as to push the disk member out from the air chamber to impair favorable unseating, that is, favorable valve openability, of the diaphragm. Furthermore, since the diameter of the small-diameter part is set with an upper limit, the invention can contribute also to downsizing of the actuator.

From the sixth aspect of the invention, by providing an actuator in a sufficiently small and simple structure and having an ensured sufficient valve-opening force, it is possible to provide a diaphragm valve with high productivity, maintenability, and usability by the sufficiently small and simple structure.

DETAILED DESCRIPTION OF PREFERRED EMBODIMENTS

Figure 1:
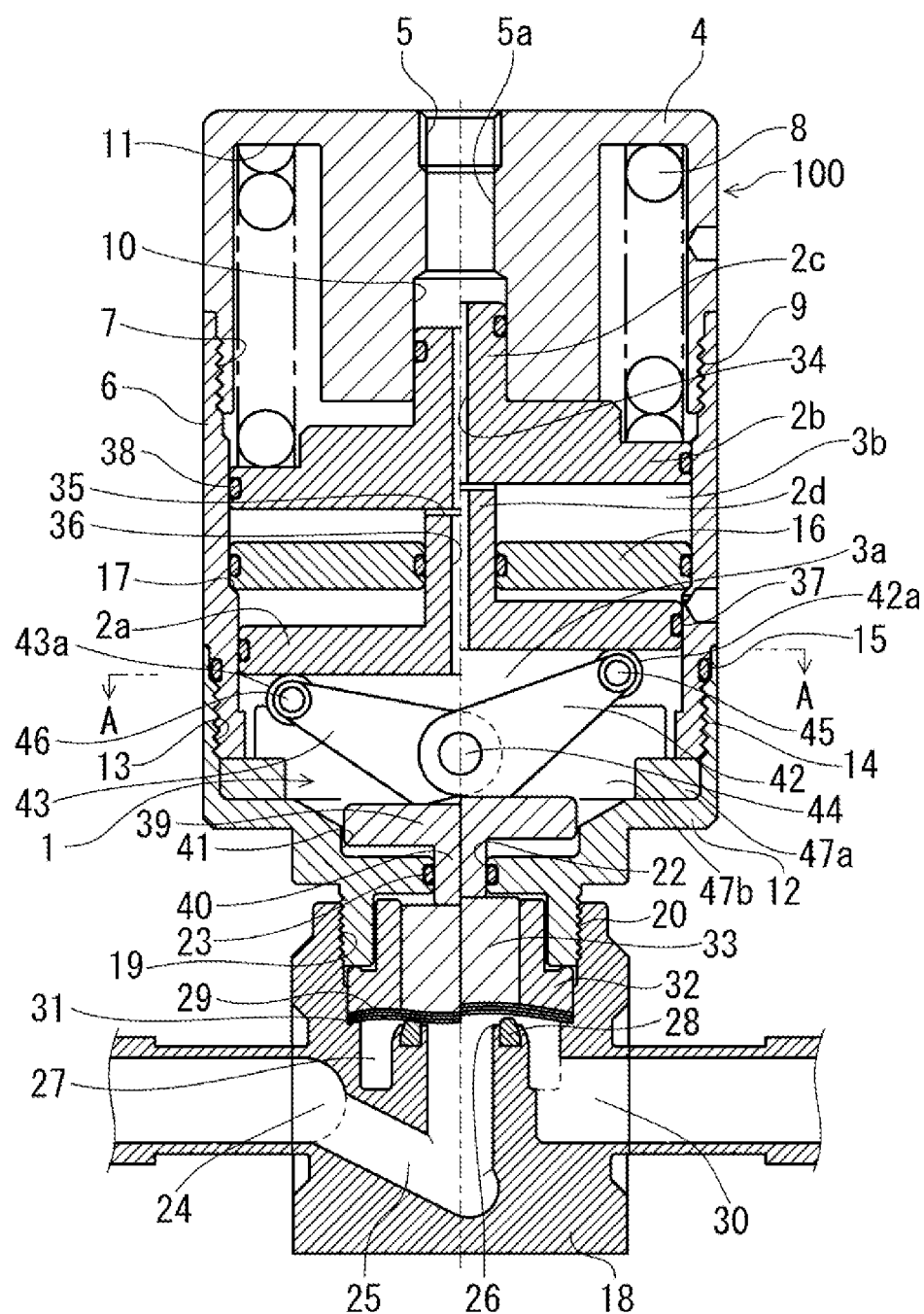
FIG. 1 is a sectional view of a diaphragm valve including a valve actuator of the present example, in which a left half from a center line depicts a valve full-closed state and a right half depicts a valve full-open state.

In the following, a structure of one embodiment of the present invention is described in detail based on the drawings. FIG. 1 is a sectional view of a valve actuator of the present embodiment (present example) and a diaphragm valve of the present example in a state of including the same, in which a left half from a center line in the drawing depicts a full-closed state of the valve of the present example and a right half depicts a full-open state of the valve of the present example.

In FIG. 1, the valve actuator of the present example is an air-driven actuator having arranged therein a piston 2 pressed by a repulsive member 8 (spring 8) provided in an actuator main body 100 and at least two air chambers 3 (3a, 3b) for moving the piston 2 by air pressure and having a booster mechanism 1 for causing a force amplified in a valve-close direction to be exhibited accommodated in any of the air chambers 3.

A cover 4 assumes an outer appearance with a substantially cylindrical shape. At an axial center position, a connecting part 5 for connecting an air source externally provided and not depicted is provided, a flow path 5a linked thereto is formed and, furthermore, a fit-in part 10 capable of fitting in the piston 2 linked thereto is provided. At a lower end of the cover 4, a male screw part 9 that can be screwed to a female screw part 7 of a casing 6 is provided. Also, inside the cover 4, a receiving part 11 for pressing the spring 8 is provided in a recessed form.

The casing 6 is formed so as to have a cylindrical outer appearance having a diameter substantially equal to that of the cover 4, with the above-described female screw part 7 formed at an upper end and a male screw part 14 that can be screwed to a female screw part 13 of a base 12 formed at a lower end. To seal between the female screw part 13 and the male screw part 14, an O ring 15 is interposed therebetween. Also, on an inner circumferential surface of the casing 6, a step part 17 to be engaged with a sub-base 16 is formed.

The base 12 has an upper part cylindrically formed with a diameter substantially equal to that of the casing 6 and a lower part formed so as to be diameter-reduced more stepwise than the upper part and having formed therein a male screw part 20 that can be screwed to a female screw part 19 of a body 18. Also, at an axial center position at the center, an attachment hole 22 is open, in which an output member 21 (disk member 21) can fit for attachment. On the inner circumferential surface of this attachment hole 22, an O ring 23 is provided.

The body 18 is engraved with an entrance flow path 24 and a primary-side flow path 25 liked thereto in a tilted manner. This primary-side flow path 25 is bent in an upward direction to communicate a secondary-side space 27 (valve chamber) via an opening 26 (valve port). To a circumferential edge part of the opening 26, a PCTFE-made valve seat 28 is fixedly attached, with its upper surface where a lower surface of a diaphragm 29 can be flexibly deformed to be closely attached (seated). The secondary-side space 27 has a substantially rectangular cross section, and is formed so as to have a deep annular groove shape. Inside the body 18 formed in a compact form and having an outer appearance in a substantially rectangular parallelepiped shape, as this secondary-side space 27, a flow-path space having a large capacity and low fluid resistance as much as possible is ensured, thereby allowing a high Cv value to be achieved. Also, a part of the secondary-side space 27 is open to communicate a linearly-formed exit flow path 30.

The diaphragm 29 is formed in a substantially circular shape and, in the present example, is configured of nine Co-alloy-made diaphragms stacked together. The outer peripheral part of the diaphragm 29 is interposed and fixed between a convex part 31 formed on the outer peripheral part of the secondary-side space 27 and a lower surface of a bonnet 32 to configure a valve chamber of the valve.

The bonnet 32 is formed in a substantially cylindrical shape and, in assembling the valve of the present example, is provided between the base 12 and the body 18. With a fastening force when the female screw part 19 is screwed to the male screw part 20, a lower end face of the base 12 pressurizes the bonnet 32. With this pressurizing force, a circumferential edge part of the diaphragm 29 is interposed between the lower surface of the bonnet 32 and the convex part 31 to be fixed in the valve chamber. Also, the inner circumferential surface of the bonnet 32 is a cylindrical space formed to have a substantially equal diameter. To this inner circumferential surface, a diaphragm piece 33 in a substantially columnar shape fits so as to be able to slide on this inner circumferential surface nearly without resistance. Also, the upper surface of the diaphragm piece 33 is provided so as to allow a lower end face of the disk member 21 fitting in the attachment hole 22 to make contact therewith.

Figure 3:
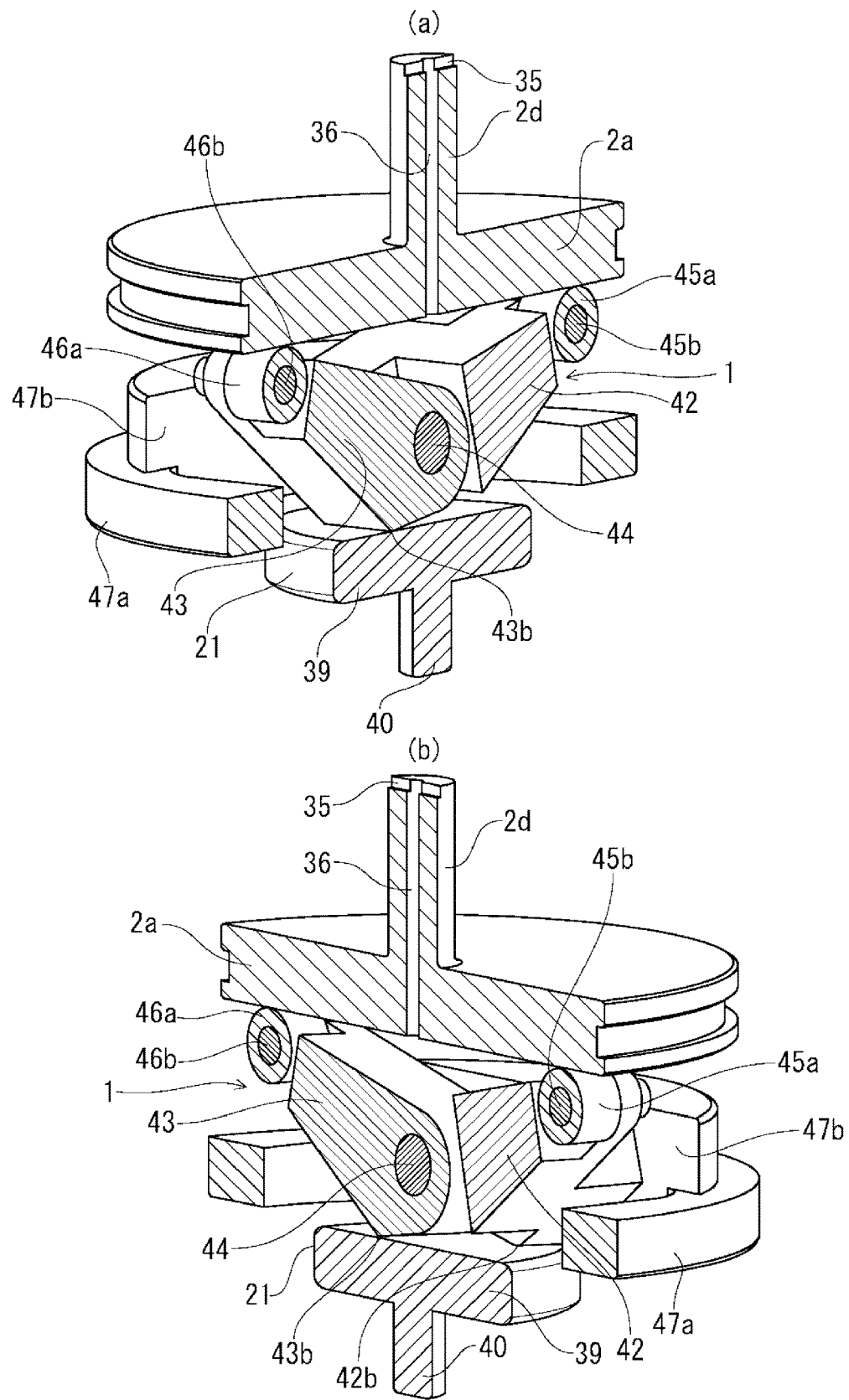
FIG. 3 is a schematic perspective sectional view schematically depicting a half-divided structure of a booster mechanism of the present example corresponding to a cross section along a B-B line in FIG. 2.

The actuator of the present invention includes at least two air chambers, solving a shortage of air driving force (valve-opening force) associated with downsizing. Any structure of this plurality of air chambers can be selected in accordance with implementation. In the present example, as depicted in FIGS. 1 and 3, with a structure in which the piston 2 is configured in a compact two-stage structure and the sub-base 16 is arranged to the step part 17 on the inner circumferential surface of the casing 6, the number of air chambers 3 for moving this piston 2 by supply air is increased to provide two.

Specifically, the piston 2 has piston parts 2a and 2b each in a circular flange shape, the two swelling in parallel, and cylindrical extended parts 2c and 2d liking center axis positions of these. Inside the extended part 2c, a flow path 34 which is externally open to conduct supply air is formed. Communicating this flow path 34, a flow path 35 open in a lateral direction and a flow path 36 in a longitudinal direction are formed also in the extended part 2d. This flow path 36 is open to the outside of the piston 2.

The piston 2 is configured by integrally forming the piston part 2a and the extended part 2d and integrally forming the piston part 2b and the extended part 2c and combining these two members together. Specifically, as for the piston part 2a and the extended part 2c, the disk-shaped piston part 2a and the columnar-shaped extended part 2d having the flow path 36 therein are integrally formed in an umbrella shape, and the circular end face of the extended part 2d is notched to make a groove passing through an opening of the flow path 36 serving as a center position of the circular end face, thereby forming a flow path 35. The piston part 2b and the extended part 2c having a flow path 34 therein are also integrally formed in a similar manner in an umbrella shape. Then, the end face of the extended part 2d notched to have the flow path 35 is combined at the center position of the piston part 2b so that the flow paths 34 and 35 communicate each other, thereby configuring the piston 2 from the two members. However, the entire piston 2 may be integrally configured from a single member.

Also, on outer circumferential edge parts of the piston parts 2a and 2b, O rings 37 and 38 are respectively provided, which can seal the inner circumferential surface of the casing 6 while sliding. The outer diameters of the piston parts 2a and 2b conform to the inner diameter above the step part 17 of the casing 6 and the inner diameter therebelow, respectively. As will be described further below, valve stroke operation of the piston 2 in the actuator main body 100 can be performed in accordance with supply and discharge of air, while hermeticity inside the air chambers 3a and 3b is maintained.

With the above-described structure, when assembling the actuator of the present example is completed, a hermetic space formed between a lower surface side of the piston part 2a and an inner circumferential surface of the base 12 becomes a first air chamber 3a to which supply air from the flow path 36 is introduced, and a hermetic space formed between a lower surface side of the piston part 2b and an upper surface side of the sub-base 16 becomes a second air chamber 3b to which supply air from the flow path 35 is introduced. In this manner, in the present example, the number of air chambers 3 is increased to provide two, that is, the first air chamber 3a and the second air chamber 3b. With the structures of these piston 2 and casing 6, the plurality of air chambers are provided in a compact form. Thus, in the present example, while an excessive increase in the size of the actuator main body 100 and an increase in the number of components are avoided, a reliable air driving force can be ensured. Note that in a range in which the height of the actuator main body 100 is allowable by conditions, for example, the casing 6 may be provided so as to be long and the piston 2 may have a structure of three stages or more.

In FIGS. 1 and 3, the disk member 21 is formed of a substantially disk-shaped large-diameter part 39 making contact with cam faces 42b and 43b of cam members 42 and 43, respectively, which will be described further below, and a substantially cylindrical small-diameter part 40 that can fit in the attachment hole 22 formed in the base 12 on a lower part of the actuator and, in the present example, these are integrally formed. Specifically, as depicted in FIG. 1, in the disk member 21 incorporated in the actuator of the present example, the small-diameter part 40 fits in the attachment hole 22 so as to be vertically slidable. A circumferential edge part of the large-diameter part 39 is engaged with a step surface 41 so as to be vertically movable, the step surface formed on a bottom surface inside the base 12 so as to conform to the shape of the large-diameter part 39. Note that as for the properties of material of the disk member 21 of the present example, a material acquired by performing MoS2 coating process (film thickness of approximately 10 μm) on steel for machine structural use (S45C-H HRC40) is used.

On the inner circumferential surface of the attachment hole 22, the O ring 23 is attached to seal a space between the attachment hole and the small-diameter part 40. In the operation of the present example, as will be described further below, the base 12 serves as a still-side member, and the disk member 21 serves as a movable-side member. Thus, if the seal member is provided on a base 12 side, the thickness of the bottom part of the base 12 can be decreased, and this is thus suitable for downsizing the valve.

In FIG. 1, the booster mechanism 1 of the present example is configured so that the paired cam members 42 and 43 are pivotally attached to one common swing shaft 44 (cam shaft) and also these paired cam members 42 and 43 are accommodated in the first air chamber 3a. In these cam members 42 and 43, contact parts 42a and 43a, respectively, which make contact with the piston 2, are provided at their upper end parts and, on the other hand, the convex cam faces 42b and 43b, respectively, which make contact with the disk member 21, are formed at their lower end parts. Note that 47a and 47b are component members of a holder 47, which will be described further below by using FIGS. 1 to 3.

The contact parts 42a and 43a are provided with roller parts 45 and 46, respectively. To the roller parts 45 and 46, rollers 45a and 46a are rotatably provided to roller shafts 45b and 46b, respectively. In the present example, these rollers 45a and 46a make contact with the lower surface of the piston part 2a so as to be rotatably movable, thereby configuring the contact parts 42a and 43a. Note that each contact part may not be provided with a roller part as described above and, as schematically depicted, for example, in FIG. 4, which will be described further below, may be configured such that an arc part in a substantially arc shape is formed at an upper end part of the cam member and this arc part directly makes contact with and slides on the lower surface of the piston. In this case, the number of components of the actuator can be reduced to allow a simple structure.

Figure 2:
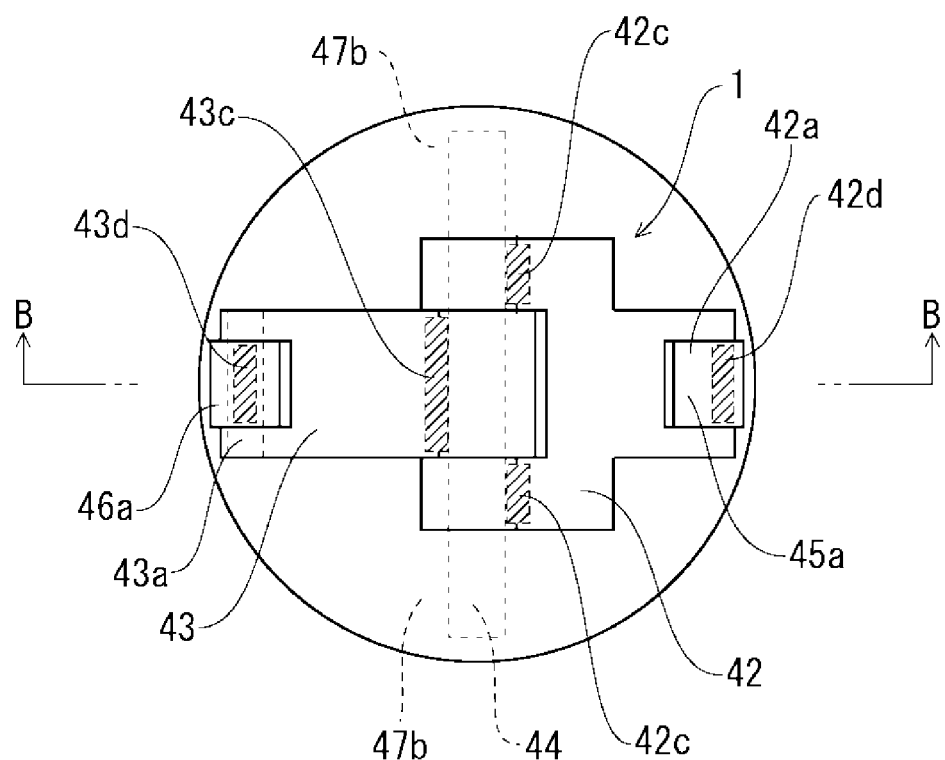
FIG. 2 is a schematic sectional view schematically depicting a cross section along an A-A line in FIG. 1.

FIGS. 2 and 3 schematically depict the structure of the booster mechanism 1 of the present example, in which FIG. 2 is a schematic sectional view when the booster mechanism 1 is viewed from a cross section along an A-A line in FIG. 1. FIGS. 3(a) and 3(b) are both schematic views of the booster mechanism 1 corresponding to a cross section along a B-B line depicted in FIG. 2, and perspective sectional view describing the structure together with a part of members arranged on the periphery inside the actuator.

As depicted in FIGS. 2 and 3, the paired cam members 42 and 43 are pivotally attached to one swing shaft 44 in a hinge shape. The cam member 42 is pivotally attached by two pivotal attachment parts each formed in a bifurcated U shape. Between these pivotal attachment parts, one pivotal attachment part of the cam member 43 is pivotally attached. Thus, as depicted in FIG. 2, an area where the cam face 42b of the cam member 42 makes contact with the disk member 21 is near an area 42c in a planar view of the actuator, and an area where the cam face 43b of the cam member 43 makes contact with the disk member 21 is near an area 43c in the drawing. Similarly, an area where the cam member 42 (roller 45a) makes contact with the lower surface of the piston 2a part is near an area 42d, and an area where the cam member 43 (roller 46a) makes contact with the lower surface of the piston 2a is near an area 43d.

As depicted in FIG. 2, the areas 42c and 43c at three locations are at positions near the axial center position (small-diameter part 40) of the disk member 21 and, furthermore, they are at substantially symmetrical positions vertically in the drawing. Therefore, pressurizing forces received from the cam faces 42b and 43b are uniformly transferred to the disk member 21 and are easily transferred directly to the small-diameter part 40, thereby making force transfer extremely favorable. Also, the areas 42d and 43d at two locations are at substantially symmetrical positions laterally in the drawing. Therefore, counterforces the lower surface of the piston part 2a receives from the cam members 42 and 43 become uniform, and an excessive eccentric force does not act on the piston 2.

Note that, as depicted in FIG. 3, both end parts of the swing shaft 44 are respectively inserted to opposing inner side surface of support parts 47b to be rotatably fixed. The holder 47 of the present example depicted in FIGS. 1 and 3 is formed of an annular part 47a annularly formed so as to conform to a low side surface of the base 12 and two support parts 47b integrally formed and arranged so as to be opposed to each other on an inner circumferential side of this annular part 47a. In assembling the actuator main body 100 of the present example, the annular part 47a in a state of being placed on a bottom surface of the base 12 is pressurized to a lower end part of the casing 6 by a fastening force when the male screw part 14 of the casing 6 is screwed to the female screw part 13 of the base 12, and is interposed and fixed between the casing and the bottom surface of the base 12.

Next, the operation of the valve actuator and the diaphragm valve including the same of the present example depicted in FIG. 1 is described. The left side in the drawing depicts a valve full-closed state, and the right side in the drawing depicts a valve full-open state. In the following, the operation when air is vented from the air chamber 3 in a full-open state is described.

When air is being vented from the air chamber 3, the internal pressure of the first air chamber 3a and the second air chamber 3b at a predetermined pressure is decreased to outside pressure. As the pressure received from the air chamber 3 is decreased, the piston 2 is depressed downward by the pressing force of the spring 8. The lower surface of the depressed piston 2 pressurizes the contact parts 42a and 43a of the booster mechanism 1 while making contact therewith to cause the cam members 42 and 43 to be respectively rotated about the swing shaft 44. With this rotation, the cam faces 42b and 43b pressurize the large-diameter part 39 of the disk member 21 to cause the disk member 21 to be depressed downward. Note that force amplification operation at this time will be descried further below.

Since a lower end part of the small-diameter part 40 of the disk member 21 makes contact with the upper surface of the diaphragm piece 33, with the disk member 21 being depressed, the diaphragm piece 33 is also depressed. Since the lower surface of the diaphragm piece 33 makes contact with the diaphragm 29, when the diaphragm piece 33 descends, by its lower surface, the upper surface of the diaphragm 29 is pressurized to be flexibly deformed. The lower surface of the diaphragm piece 33 deforms the diaphragm 29 so that the diaphragm is recessed downward. With the lower surface of the diaphragm 29 being press-fitted to the upper surface of the valve seat 28 with a predetermined pressure, the diaphragm piece 33 is engaged at a valve-stroke lower-limit position, and also the primary-side flow path 25 of the valve chamber and the secondary-space 27 are separated to cause the valve to become in a full-closed state.

Next, the operation is described in which the air chamber 3 in this full-closed state is filled with air to become in a full-open state. When air is introduced to the air chamber 3, air injected from an air source not depicted passes through the flow path 34 provided to the extended part 2c of the piston 2, and next passes through the flow path 35 provided to the extended part 2b to be injected to the second air chamber 3b. Simultaneously, air passes through the flow path 36 provided to the extended part 2d to be injected also to the first air chamber 3a.

The piston 2 is pressed by the spring 8 downward. In the first air chamber 3a, only the piston part 2a is a movable member, except the disk member 21, which will be described further below. Thus, when the air pressure of the air chamber 3a increases to exceed the pressing force of the spring 8, this air pressure acts to push the piston part 2a upward. Similarly, also in the second air chamber 3b, since the sub-base 16 is fixed to the inner circumferential surface of the casing 6, only the piston unit 2b is a movable member and, when the air pressure in the air chamber 3b increases to exceed the pressing force of the spring 8, the piston part 2b is pushed upward. Thus, while keeping hermetic seal between the piston and the inner circumferential surface of the casing 6, the entire piston 2 slides to be pushed upward.

Here, the air pressure acting on the piston 2 is proportional to the area of the piston 2 oriented to the inside of the air chamber 3. In the present example, as for the air chamber 3, in addition to the first air chamber 3a, the second air chamber 3b is provided to configure two stages in a compact form via the sub-base 16 formed to be thin inside the same casing 6. Thus, while an increase in the size of the actuator is avoided, a sufficient piston area is ensured.

On the other hand, the diaphragm 29 has a shape self-reset force. Thus, as described above, with an increase in the pressure inside the air chambers 3a and 3b, the contact parts 42a and 43a of the cam members 42 and 43 are released from pushing-down pressing by the piston 2, and then the diaphragm 29 can return to have a convex shape mildly curved upward in a natural state by a self-reset counterforce. With this self-reset, the diaphragm becomes unseated from the valve seat 28 to cause the valve to become in a full-open state. More specifically, with this counterforce, the diaphragm piece 33 is pushed upward, and the disk member 21 is thereby also pushed upward. With this, the disk member 21 pushes up the cam faces 42b and 43b. This causes the cam members 42 and 43 to rotate about the swing shaft 44.

Figure 4:
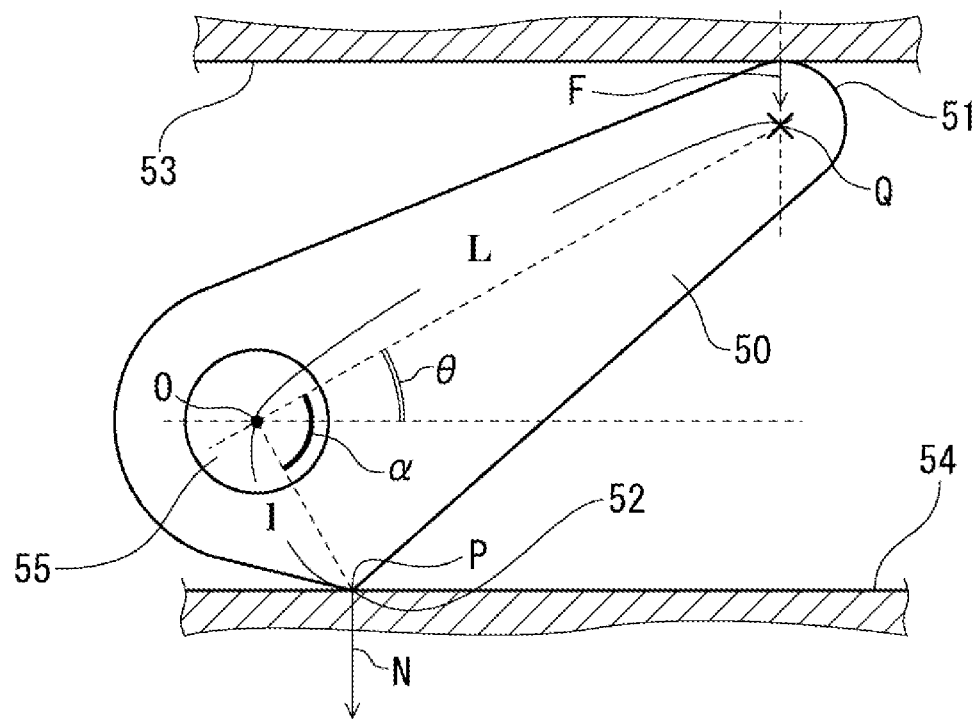
FIG. 4 is a descriptive diagram schematically describing a boosting operation by a cam member of the present example.

Next, by using FIG. 4, the principle of force amplification by the booster mechanism 1 of the present example is geometrically described. FIG. 4 schematically depicts a side view of one cam member of the present example. The following principle of force amplification is common between both of the paired cam members 42 and 43.

In FIG. 4, 50 schematically depicts the shape of the cam member of the present embodiment. At an upper end part, a contact part 51 is provided. At a lower end part, a convex cam face 52 is provided. The contact part 51 in the drawing is depicted as simplified and is in a simple arc shape without having a roller part as described above, and a point Q indicates a center position of this arc. The contact part 51 makes contact with a lower surface 53 of the piston, and the cam face 52 makes contact with an upper surface 54 of the disk member. 55 denotes the swing shaft, and a point O is its axial center position. Also, a force the contact part 51 receives from the lower surface 53 is taken as F and, since the contact part 51 is in an arc shape, the force F is oriented to a direction of the point Q vertically below. Similarly, a force the cam face 52 gives to the upper surface 54 is taken as N, and the contact location is indicated by a point P.

Also, the length of a line segment OP is taken as 1, the length of a line segment OQ is taken as L, and a crossing angle of the line segments OP and OQ is taken as α. These are constants all unique to the shape of the cam member. Also, a tilted angle of the line segment OQ from the horizontal direction is taken as θ. In this case, according to the principle of leverage (relation between F and N), a force amplification ratio N/F is as follows.

$$N/F = L/l \times \cos\theta / \cos(\alpha - \theta)$$ [Equation 1]

In the range of the valve stroke of the present example, since fluctuations the angle θ is in a small range, stable boosting action can be acquired roughly depending on how the shape of the cam member is set.

With the above-described structure, by taking the contact parts 42a and 43a as points of efforts, the swing shaft 44 as a fulcrum, and the cam faces 42b and 43b as point of loads, from the principle of leverage, with the cam members 42 and 43 rotating about the swing shaft 44, the motive power of the piston 2 pressed by the repulsive member (spring 8) is amplified and transferred to the output member (disk member 21) and, via this output member, the diaphragm 29 is pressurized to the valve seat 28 provided in the body 18 for valve closing.

Also as depicted in FIG. 1, in the actuator of the present example, the contact parts 42a and 43a are provided with roller parts 45 and 46, respectively. Thus, rollers 45a and 46a of these roller parts are pressed to make contact with the lower surface (contact surface) of the piston part 2a. Also, when the piston 2 ascends and descends with the valve opening and closing as described above, the rollers 45a and 46a accordingly rotate and move on the lower surface of the piston part 2a almost without resistance, and the cam members 42 and 43 accordingly rotate about the swing shaft 44.

Furthermore, the small-diameter part 40 of the disk member 21 of the present example has a diameter set at a diameter to the extent that when air is supplied into the first air chamber 3a, a force by which the disk member 21 is moved toward inside the air chamber 3a based on a self-reset counterforce of the diaphragm 29 is larger than a pressure with which the disk member 21 is pushed by a supply air pressure to outside of the air chamber 3a.

That is, when air is supplied to the first air chamber 3a to increase the internal pressure, the contact surface of the piston part 2a as an upper surface and the disk member 21 fitting in the attachment hole 22 are movable members on the inner circumferential surface of the air chamber 3a. Thus, the internal pressure of the air chamber 3a as a hermetic space also acts on the disk member 21 in addition to the piston part 2a. This acts in a manner such that while the small-diameter part 40 is caused to slide with respect to the O ring 23 of the attachment hole 22, the disk member 21 is pushed downward. Thus, when air is introduced to the air chamber 3a to release pressing of the diaphragm piece 33 to open the valve by a self-reset counterforce of the diaphragm 29, the air pressure may contrarily pressurize the disk member 21 to impede valve-open operation. This is a unique problem associated with accommodation of the booster mechanism 1 together with the disk member 21 in the air chamber 3a.

Here, a force with which the disk member 21 is pushed down by the air pressure of the air chamber 3a has a value acquired by multiplying, by the air pressure, an area acquired by subtracting a pressure-receiving area of the lower surface of the large-diameter part 39 from a pressure-receiving area of the upper surface of the large-diameter part 39, that is, the area of the lower surface of the small-diameter part 40. Thus, except its own weight of the disk member 21 and so forth, in principle, the force with which the disk member 21 is pushed down by the air pressure of the air chamber 3a in contrast to valve-open operation as described above is determined in accordance with the size of the outer diameter of the small-diameter part 40 (or its corresponding inner diameter of the attachment hole 22).

By contrast, in the actuator of the present example, the size of the outer diameter of the small-diameter part 40 (the size of the inner diameter of the attachment hole 22) is set in a range equal to or smaller than the size such that the force with which the diaphragm 29 pushes up the disk member 21 via the diaphragm piece 33 by the self-reset counterforce is maintained larger than the force with which the disk member 21 is pushed down as described above. Thus, favorable valve openability is not impeded with air supply to the air chamber 3a.

Specifically, in the diaphragm valve of the present example, a previous study of a relation between the force of pressurizing the apex of the diaphragm 29 and the flow rate of the valve revealed that the flow rate of the valve is maintained approximately equal to the flow rate in a full-open state in a range in which the pressurizing force is zero to small values because sinking of the diaphragm 29 by the pressurizing force is small, but the flow rate of the valve starts decreasing gradually due to the influence of the sinking of the diaphragm 29 roughly when the pressurizing force exceeds 30N. Also, it turned out that, eventually, the diaphragm 29 is seated on the valve seat 28 by a pressurizing force of approximately 500 N to reach a complete valve-closed state.

Thus, in order to eliminate a situation in which the disk member 21 pressurizes the diaphragm 29 by being adversely affected, that is, pushed downward, by the air pressure introduced to the air chamber 3a at the time of valve-open operation to cause a failure in valve-open operation and a decrease the flow rate, it is only required to set the air pressure acting on the disk member 21 at 30 N or smaller at maximum.

On the other hand, the diaphragm valve of the present example is designed by assuming a maximum use pressure of air of 0.7 MPa. When the diameter of the small-diameter part 40 of the disk member 21 was set at $\phi 5.2$ mm, the pushing-down force by the air pressure acting on the disk member 21 was on the order of approximately 15 N. Thus, if the diameter of the small-diameter part is set at the size to this degree, even if the disk member 21 is pushed down while the maximum air pressure introduced to the air chamber 3a acts thereon, the diaphragm 29 does not sink, and thus the problem of impeding valve-open operation as described above does not occur.

Also, as for the force causing a decrease of the flow rate as described above, conditions vary depending on the shape, properties of material, thickness, and the number of stacked sheets of the diaphragm of the valve to be designed; the temperature and pressure of the valve and the fluid for use; the air pressure for use; and so forth. Therefore, the large-diameter part and the small-diameter part of the disk member are designed as appropriate in accordance with each condition in consideration of the value of the force with which a decrease of the flow rate may occur.

Furthermore, the present invention is not limited to the description of the above embodiments, and can be variously modified in a range not deviating from the gist of the invention described in claims of the present invention.

REFERENCE SIGNS LIST 1 booster mechanism
2 piston
3 (3a, 3b) air chamber
8 spring (repulsive member)
18 body
21 disk member (output member)
23 O ring
28 valve seat
29 diaphragm
39 large-diameter part
40 small-diameter part
42, 43 cam member
42a, 43a contact part
42b, 43b cam face
44 swing shaft
45, 46 roller part
45a, 46a roller
100 actuator main body

The invention claimed is:

1. A valve actuator comprising:
an actuator main body;
a repulsive member provided in the actuator main body;
a piston pressed by the repulsive member;
at least two air chambers arranged in the actuator main body for moving the piston by an air pressure;
a booster mechanism accommodated in a first air chamber of the at least two air chambers for exerting a force amplified in a valve-closing direction; and
an output member,
wherein the booster mechanism is configured so that paired cam members are pivotally attached to a common swing shaft, and the paired cam members are accommodated in the first air chamber,
wherein the paired cam members each have a contact part provided at a respective upper end part, each contact part being in contact with the piston,
wherein the paired cam members each have a cam face formed at a respective lower end part, each cam face being in contact with the output member,
and wherein motive power of the piston pressed by the repulsive member is amplified by the paired cam members rotating via the common swing shaft by taking the contact parts as points of effort, taking the common swing shaft as a fulcrum, and taking the cam faces as points of load, and is transferred to the output member.

2. A diaphragm valve including the valve actuator according to claim 1, wherein a diaphragm is pressed via the output member to a valve seat provided in a body for valve-closing.

3. The valve actuator according to claim 1, wherein each contact part is provided with a roller part having a roller, and the rollers are configured to rotate and move along a contact surface of the piston together with movement of the piston such that the paired cam members rotate via the common swing shaft.

4. The valve actuator according to claim 3, wherein the output member is a disk member formed of a large-diameter part in contact with the cam faces of the paired cam members and a small-diameter part that can fit in an attachment hole formed in a base on a lower part of the valve actuator, and an O ring is attached to an inner circumferential surface of the attachment hole to seal between the inner circumferential surface and the small-diameter part.

5. A diaphragm valve including the valve actuator according to claim 3, wherein a diaphragm is pressed via the output member to a valve seat provided in a body for valve-closing.

6. The valve actuator according to claim 1, wherein the output member is a disk member formed of a large-diameter part in contact with the cam faces of the paired cam members and a small-diameter part that can fit in an attachment hole formed in a base on a lower part of the valve actuator, and an O ring is attached to an inner circumferential surface of the attachment hole to seal between the inner circumferential surface and the small-diameter part.

7. A diaphragm valve including the valve actuator according to claim 6, wherein a diaphragm is pressed via the output member to a valve seat provided in a body for valve-closing.

8. The valve actuator according to claim 6, wherein a diameter of the small-diameter part is set such that when air is supplied into the first air chamber, a force by which the disk member is moved in a direction toward an inside of the first air chamber based on a self-reset counterforce of a diaphragm is larger than a pressure with which the disk member is pushed by a supply air pressure in a direction toward an outside of the first air chamber.

9. A diaphragm valve including the valve actuator according to claim 8, wherein a diaphragm is pressed via the output member to a valve seat provided in a body for valve-closing.

* * * * *